United States Patent [19]

Works

[11] 4,445,119

[45] Apr. 24, 1984

[54] DISTRIBUTED BEAM STEERING COMPUTER

[75] Inventor: George A. Works, Stow, Mass.

[73] Assignee: Raytheon Company, Lexington, Mass.

[21] Appl. No.: 259,291

[22] Filed: Apr. 30, 1981

[51] Int. Cl.[3] .............................................. H04B 7/00

[52] U.S. Cl. .................................... 343/377; 343/372

[58] Field of Search ............ 343/100 SA, 843, 117 A, 343/377, 372; 333/17 M; 364/200

[56] References Cited

U.S. PATENT DOCUMENTS

| | | | |
|---|---|---|---|
| 3,305,867 | 2/1967 | Miccioli et al. | 343/113 |
| 3,560,985 | 2/1971 | Lyon | 343/853 |
| 3,680,109 | 7/1972 | Steudel | 343/100 SA |
| 3,683,386 | 8/1972 | Leysieffer | 343/117 A |
| 3,697,994 | 10/1972 | O'Daniel | 343/100 SA |
| 3,745,580 | 7/1973 | Burnham | 343/100 SA |
| 3,775,769 | 11/1973 | Heeren et al. | 343/100 SA |
| 4,087,855 | 5/1978 | Bennett et al. | 364/200 |

*Primary Examiner*—Maynard R. Wilbur
*Assistant Examiner*—M. R. Gordon
*Attorney, Agent, or Firm*—Walter F. Dawson; Joseph D. Pannone

[57] ABSTRACT

A distributive beam steering computer network for a radar phased array antenna is disclosed which provides direct drive for individual antenna phase shifter elements using a plurality of microcomputers co-located with each phase shifter. The microcomputers calculate the phase shift based on constants stored in a ROM which is located in each microcomputer and phase shift data comprising sin $\alpha$, sin $\beta$, and $1/\lambda$ signals are distributed to all microcomputers over a single serial data line. The constants required for each shifter are different, and therefore, the ROM in each microcomputer is programmed for a specific location in an array antenna. A phase shift steering command for each element of the phased array antenna is calculated using a shift-and-add multiplication algorithm which is hard-wired into each microcomputer.

31 Claims, 3 Drawing Figures

DISTRIBUTED BEAM STEERING COMPUTER

BACKGROUND OF THE INVENTION

This invention relates to an electronically scanned phased array antenna, and more particularly to a computing element for each antenna phase shifter element.

A phased array antenna is composed of a plurality of radiating elements positioned in a spaced-apart relationship. Such an antenna in a radar system is well adapted to electronic scanning techniques which permit a directional beam of electromagnetic energy to be moved rapidly from one direction to another by means of a plurality of phase shifter elements.

A phased array antenna may be optically fed from one or more radiant sources. Uncollimated and unsteered power from said radiant source incident upon an individual element passes through the phase shifting device and is radiated therefrom with a phase relationship determined by the setting of the individual phase shifter so as to provide the desired collimated and steered radiated phase front. Since said device is reciprocal, energy reflected from distant objects and impinging on the array in the form of substantially parallel rays will be focused by the array in a direction corresponding to the setting of the individual phase shifter.

In the prior art, phased array radar systems have used a central beam steering computer for calculating phase shifter command signals for each phase shifter element in an array antenna. These calculations consumed considerable computer time. Typically, there are thousands of phase shifter elements requiring a great number of wires to transmit the required phase shift information to these elements. In addition, the reliability of such systems was greatly affected by a single failure in the central beam steering unit.

Another approach in the prior art of phased array antennas for generating phase shift command signals involved a matrix distribution technique. Phase shift commands are calculated in two parts wherein one part is distributed along the X direction or rows of an X-Y matrix of phase shifter elements and the other part is distributed along the Y direction or columns. At each phase shifter there is co-located a simple adder that adds together the X and Y phase shift command parts forming the complete phase shift command word. Collimation correction factors have to be approximated using this shift command signal approach, but this approach reduces the amount of wiring required to distribute the command signals to the phase shifter, and therefore improves the system reliability. However, this approach is limited to uniformly spaced antenna array elements in a plane.

A serial data line and a clock line in the present invention further reduces the amount of wiring required to transfer phase shifter command signals to an array antenna and other techniques such as RF transmission may be utilized for such data and clock transfers. System reliability is further improved by not having a central beam steering computer that can fail. In addition, the distributed approach described in this invention does not require the elements to be uniformly spaced or located in a plane.

SUMMARY OF THE INVENTION

This invention discloses a distributed beam steering computer comprising a plurality of microcomputers in a phased array radar system. The array antenna in such a system comprises a plurality of array elements each of said array elements comprising a distributed beam steering microcomputer, a phase shifter and an antenna element, a source of electromagnetic energy for providing a steerable beam, means for connecting each phase shifter to said source of electromagnetic energy, and means for providing data to said distributed beam steering microcomputer for determining an amount of phase shift for said beam. Each of the distributed beam steering microcomputers comprises stored data constants dependent upon the location of the microcomputers in the array antenna. An input serial data line provides a plurality of parameters simultaneously to all distributed microcomputers for determining the amount of phase shift to be calculated.

The invention further discloses a plurality of array elements, each of said elements comprising a distributed beam steering microcomputer. The distributed microcomputer comprises means for storing data word constants used for calculating a phase shift for an electromagnetic beam, means for receiving serial data words used for calculating a phase shift, means for performing multiplication and addition arithmetic operations required for calculating a phase shift, means for generating control signals for establishing a sequence of control states for performing said arithmetic operations, and register means for storing intermediate and final phase shift calculations.

The invention further discloses the method of calculating a phase shift for an electromagnetic beam of a phased array antenna comprising the steps of distributing a beam steering microcomputer in each of a plurality of array elements in said antenna, performing addition and multiplication arithmetic operations for calculating said phase shift by using arithmetic logic means in the microcomputer, transferring data constants and partial phase shift summations for each of the array elements to the arithmetic logic means by a multiplexer gating means in the microcomputer, storing the data constants for each of the array elements in a read-only memory means in said microcomputer, calculating the amount of phase shift from input serial data words received by the microcomputer, and storing intermediate and final phase shift calculations by register means in the microcomputer. The step of storing the data constants comprises at least three data words in the read-only memory. The step of calculating the amount of phase shift from the input serial data comprises at least three phase shift parameter data words, with a sum control bit means between the said second and third phase shift parameter data words; the input serial data words enter each microcomputer with a least significant bit first and a most significant bit last to facilitate the addition and multiplication operations.

BRIEF DESCRIPTION OF THE DRAWINGS

Other and further features and advantages of the invention will become apparent in connection with the accompanying drawings wherein.

DESCRIPTION OF THE PREFERRED EMBODIMENT

Figure 1:
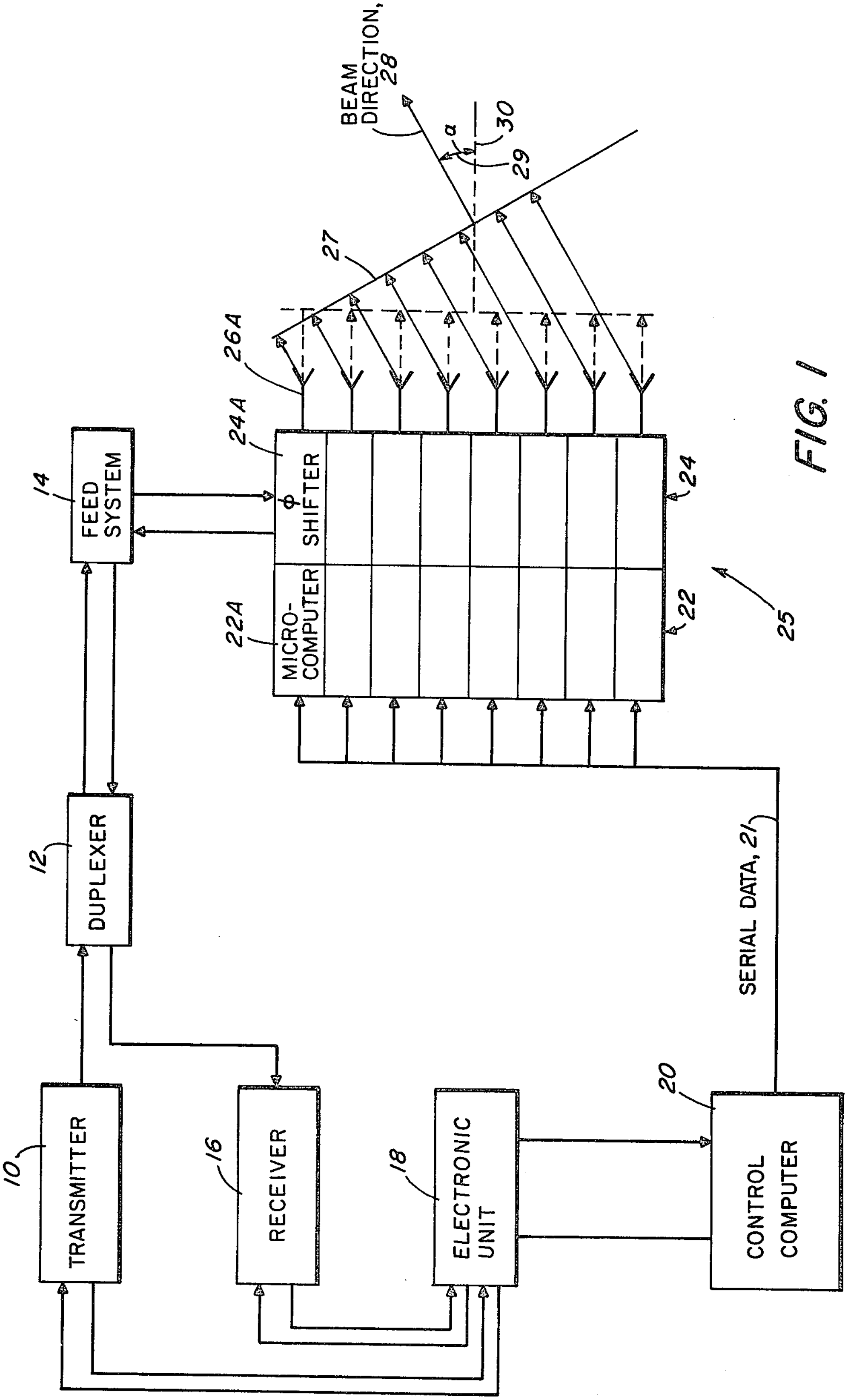
FIG. 1 is a simplified block diagram of a phased array radar system embodying the distributed beam steering microcomputer invention at each phase shifter element of a phased array antenna.

Referring now to FIG. 1 there is shown a phased array antenna subsystem 25 comprised of a plurality of elements each element comprising a distributed beam steering microcomputer 22A, a phase shifter 24A and an antenna 26A. The microcomputer in this invention comprises a semiconductor integrated circuit or a plurality of integrated circuits that calculate the phase shift for an array antenna utilizing a hard-wired shift-and-add algorithm. Electromagnetic energy is propagated from a feed system 14 to a phase shifter element 24A which determines the direction of the energy beam 28 emitted from the antenna subsystem. Beam steering is accomplished by calculating the amount of phase shift to be applied to the radiant energy from the feed system 14.

A source of electromagnetic energy is provided by a transmitter 10 and a duplexer 12 controls the energy being transmitted and received by the array antenna 25. A radar return signal is sent to a receiver 16 and an electronic unit 18 provides timing and control signals for the complete radar system. A control computer 20 performs the data processing of the radar data and provides phase shift parameter data words to all the destributed beam steering microcomputers 22 over serial data line 21.

Figure 2:
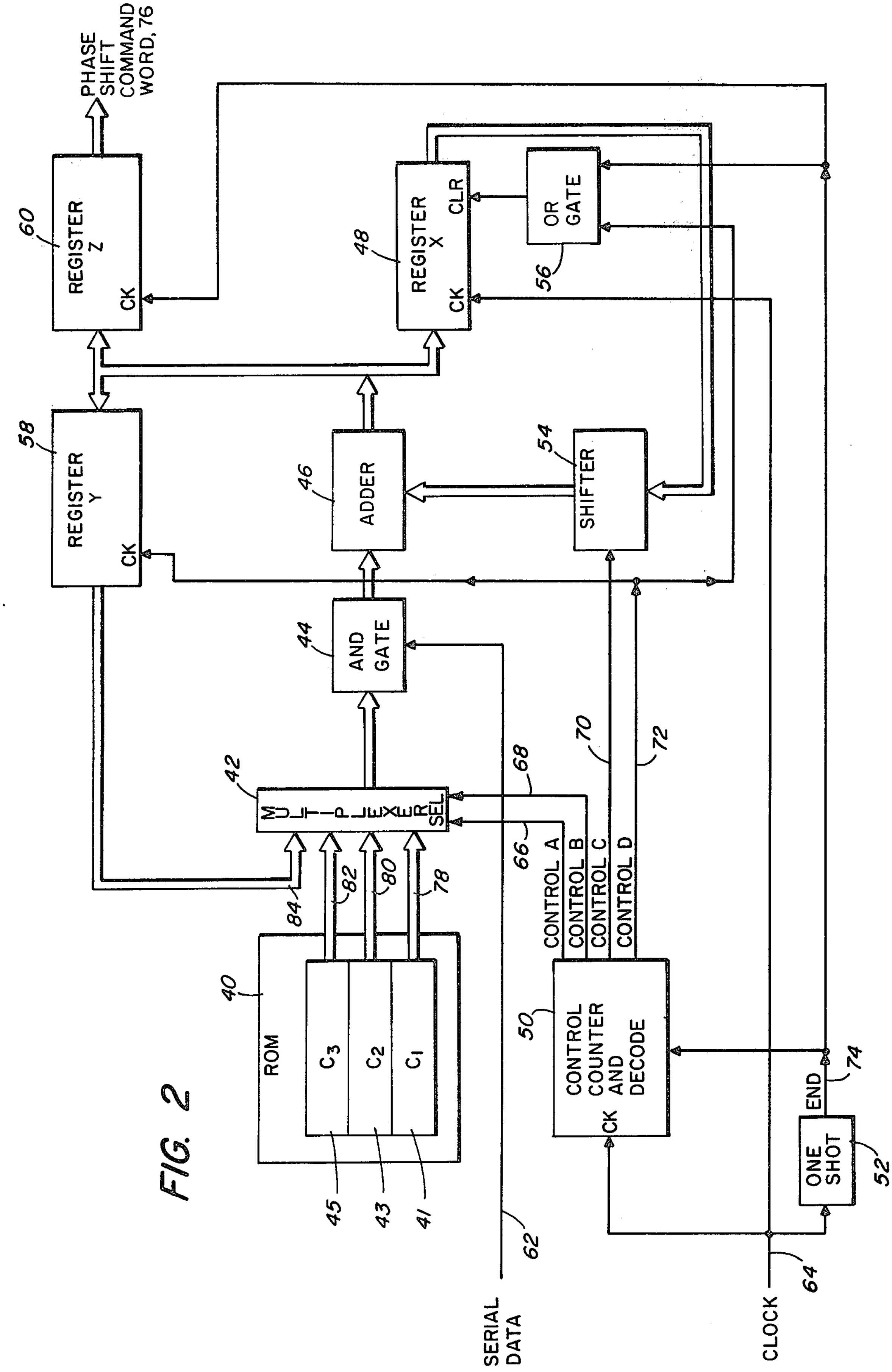
FIG. 2 is a block diagram of the distributed beam steering microcomputer invention.

The phase shift calculation for each phase shifter is performed in a distributed beam steering microcomputer 22A co-located with each phase shifter 24A. Serial data 21 is simultaneously sent to all distributed beam steering microcomputers 22 specifying the amount of phase shift to be calculated by each microcomputer. As shown in FIG. 2, stored in a read-only memory, ROM 40, of each microcomputer are three data constants $C_1$, $C_2$, and $C_3$. These constants which are different for each phased array antenna element location are used to calculate the phase shift for each antenna element, one of which is designated 26A in FIG. 1, so that the radiated energy 27 will have the desired beam direction 28.

Figure 3:
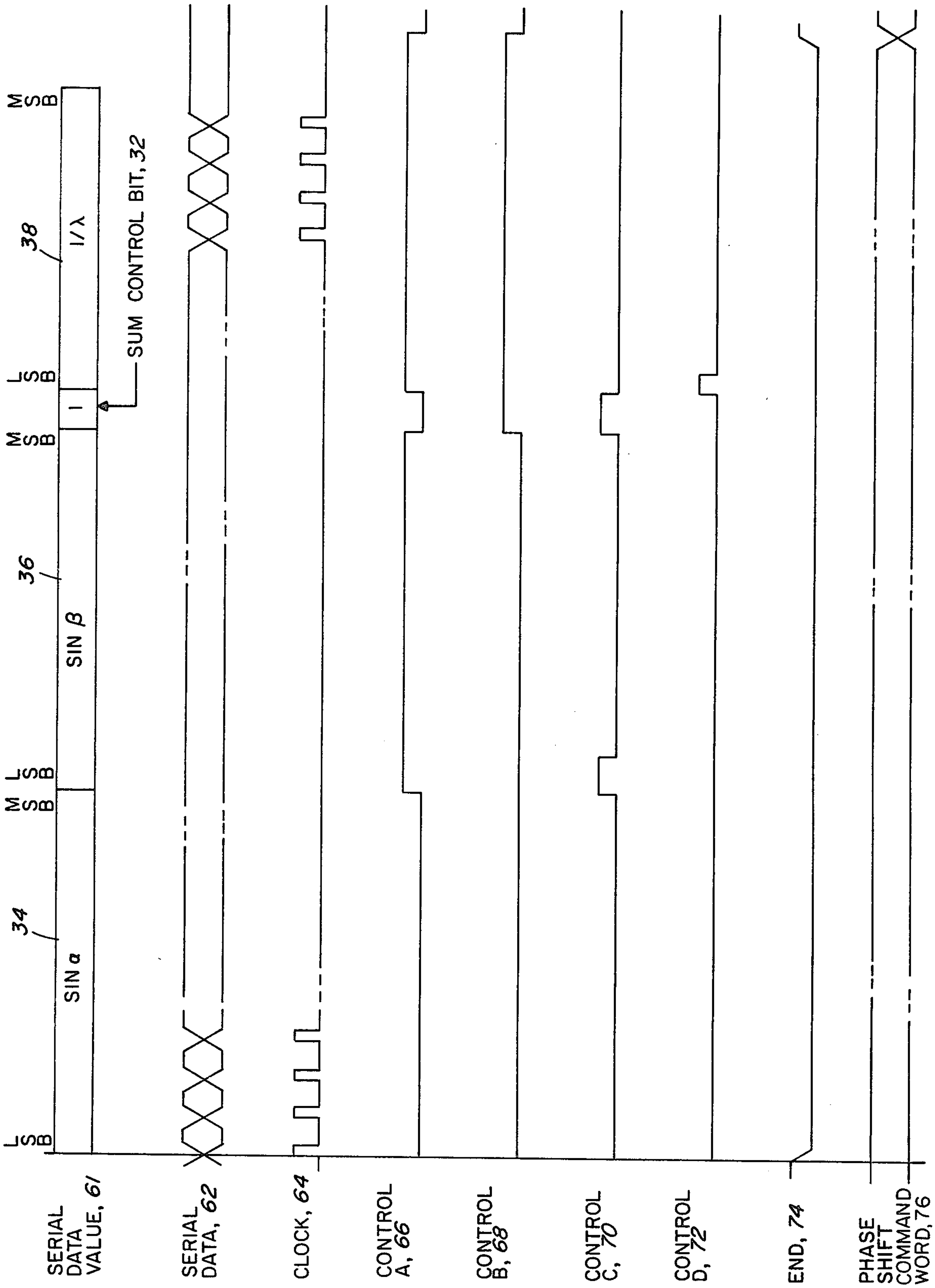
FIG. 3 is a timing diagram for the distributed beam steering microcomputer invention showing the control signals relative to three phase shift parameter serial data words comprising sin $\alpha$, sin $\beta$ and $1/\lambda$.

FIG. 2 is a block diagram of a distributed beam steering microcomputer. A ROM 40 stores three constants $C_1$, $C_2$, and $C_3$ in three memory locations 41, 43, and 45. A multiplexer 42 selects which one of four inputs 78, 80, 82, and 84 will be transferred to AND gate 44. This selection is determined by the two control lines control A 66 and control B 68 which are generated by the control counter and decode 50. Control C 70 determines whether shifter 54 does a left shift by n bits or a right shift by one bit and control D 72 clocks data into register X 48 (via OR gate 56) and register Y 58. The input serial data 62 comprises three phase shift parameter data words sin $\alpha$ 34, sin $\beta$ 36, and $1/\lambda$ 38 along with a sum control bit 32 between sin $\beta$ 36 and $1/\lambda$ 38 data words as shown in FIG. 3 for every phase shift calculation. The number of bits in each one of said phase shift parameter data words is determined by the number of elements in an array antenna, the spacing between the elements and the number of bits of results required to control a phase shifter, all of which are readily determined by one of ordinary skill in the art. The combination of AND gate 44, adder 46 and shifter 54 provide a multiplication arithmetic operation capability. Register X 48 and register Y 58 store intermediate phase shift calculation results and register Z 60 stores the final phase shift command word 76. The clock 64 provides timing for the operation of the distributed beam steering microcomputer and the one shot 52 provides an end 74 signal which indicates the end of a phase shift calculation causing the final phase shift command word 76 to be stored in register Z 60.

The calculation performed by each distributed beam steering microcomputer solves the equation:

$$\phi = 1/\lambda(C_1 \sin\alpha + C_2 \sin\beta + C_3)$$

In this equation, $\phi$ is the amount of phase shift per array element required to achieve a certain overall beam direction 28 as illustrated in FIG. 1. The computed result of the phase shift command word comprises an integer part plus a fractional part. Only the fractional part, or least significant bits, are needed to control the phase shifter in a phase steered antenna. In a time-delay steered antenna, the complete phase shift command word would be used. Constants $C_1$ and $C_2$ provide X and Y coordinate information for each element in an array antenna required to point the beam direction 28 in a specific direction. Constant $C_3$ provides compensation for differences in electrical distances from the feed system 14 to the various array antenna elements required for focusing the beam. Alpha ($\alpha$) represents the elevation angle and beta ($\beta$) represents the azimuth angle; lambda ($\lambda$) represents the wavelength of the transmitted beam. A set of constants $C_1$, $C_2$, and $C_3$ are different for each element of an array antenna which also provides an inherent self-test capability of each element by utilizing these constants to address an element. Sin $\alpha$, sin $\beta$ and $1/\lambda$ phase shift parameters are simultaneously sent to all array elements for determining a specific amount of phase shift or beam direction. Therefore, the constants are stored in each distributed beam steering microcomputer and the phase shift parameters are received via serial data line 62 as shown in FIG. 2. The sequence of arrival of the phase shift serial data value 61 into the microcomputer is shown in FIG. 3. The reciprocal of $\lambda$ or $1/\lambda$ is sent to the distributed beam steering microcomputer so that a multiplication is performed instead of a division when calculating the phase shift, $\phi$.

Referring now to FIG. 2, at the start of a phase shift calculation the control counter and decode 50 and register X 48 are cleared by the clock 64. As the sin $\alpha$ data word arrives, with the least significant bit (LSB) first, the constant $C_1$ is multiplied by sin $\alpha$ using a standard shift-and-add algorithm known to one skilled in the art. The control for this algorithm is performed by the control counter and decode 50. During the multiplication process of shifts-and-adds the partial product is temporarily stored in register X 48 and it is shifted one bit to the right in shifter 54 before each addition performed by the adder 46; however, the addition is inhibited whenever a zero bit occurs in the data word. When the most significant bit (MSB) of sin $\alpha$ is received and processed, register X 48 contains the product $C_1$ sin $\alpha$. When the LSB of sin $\beta$ enters the microcomputer, the contents of register X 48 are shifted n places to the left where n represents the maximum number of bits in the sin $\alpha$ data word. The computer then proceeds to multiply $C_2$ by sin $\beta$ using the same shift-and-add algorithm as before. As the sin $\beta$ data word enters the computer, one bit per clock pulse, and the multiplication operation begins, each partial product is added to $C_1$ sin $\alpha$ as a result of the n bit shift left in register X 48 prior to the start of this multiplication process. When the MSB of sin $\beta$ is received and processed, register X 48 contains the partial sum $$C_1 \sin \alpha + C_2 \sin \beta.$$

The next bit received by the distributed beam steering microcomputer on the serial data line 62 after the sin $\beta$ data word is a sum control bit 32. This control bit must be a logic 1 to permit the constant $C_3$ to be added to the partial sum $C_1 \sin \alpha + C_2 \sin \beta$ after said partial sum is transferred to the adder 46 from register X 48. The new sum $C_1 \sin \alpha + C_2 \sin \beta + C_3$ is clocked into register Y 58 by the control D 72 signal.

One more multiplication process occurs when the first bit of the $1/\lambda$ serial data word enters the microcomputer. The new sum now stored in register Y 58 is multiplied by the $1/\lambda$ data word using the same shift-and-add algorithm as for the previous multiplications. This causes the sum $C_1 \sin \alpha + C_2 \sin \beta + C_3$ to be transferred from register Y 58 via multiplexer 42 to AND gate 44 during each partial product operation. At the conclusion of this multiplication process the product, $\phi = 1/\lambda (C_1 \sin \alpha + C_2 \sin \beta + C_3)$ is transferred to register Z 60 by the end 74 signal as shown in FIG. 2 and FIG. 3 and the phase shift command word 76 is now available for controlling the phase shifter element 24A shown in FIG. 1.

This concludes the description of the preferred embodiment. However, many modifications and alterations will be obvious to one of ordinary skill in the art without departing from the spirit and scope of the inventive concept. Therefore, it is intended that the scope of this invention be limited only by the appended claims.

What is claimed is:

1. In combination:
a plurality of array elements for providing a directed beam of electromagnetic energy;
each of said array elements comprising a microcomputer, a phase shifter coupled to said microcomputer, and an antenne element;
a source of said electromagnetic energy;
means for feeding said electromagnetic energy to said plurality of antenna elements through the plurality of phase shifters;
means for coupling common phase shift data to each microcomputer in said array elements for determining an amount of phase shift for said beam; and
each microcomputer comprising means for calculating said amount of phase shift for each of said antenna elements in accordance with the position of each antenna element in said array and said phase shift data.

2. The combination as recited in claim 1 wherein:
each of said microcomputers comprises stored data constants dependent upon the location of said microcomputers in said array.

3. The combination as recited in claim 2 wherein:
said stored data comprises at least three constants for providing element location correction data.

4. The combination as recited in claim 1 wherein:
said coupling means for determining an amount of phase shift comprises a serial data line.

5. The combination as recited in claim 4 wherein:
said serial data line provides a plurality of common parameters simultaneously to each microcomputer of said array elements for determining said amount of phase shift.

6. In combination:
a plurality of array elements for providing a directed beam of electromagnetic energy, each of said elements comprising a microcomputer, a phase shifter coupled to said microcomputer, and an antenna element;
means for storing in each of said microcomputers data constants used for calculating a phase shift for said directed beam, one of said constants providing phase shift compensation based on the position of said antenna element in said array of elements;
means for receiving in said microcomputer serial data words for determining said phase shift, said data words being fed in common to each of said array elements;
means for performing in said microcomputer addition and multiplication arithmetic operations required for calculating said phase shift;
means for generating control signals in said microcomputer for establishing a sequence of control states for performing said arithmetic operations; and
register means in said microcomputer for storing intermediate and final phase shift calculations.

7. The combination as recited in claim 6 wherein:
at least three of said constants are stored in read-only memory for providing phase shift position compensation for each antenna element and a self-test capability for each of said array elements.

8. The combination as recited in claim 6 wherein:
said receiving means comprises a gate means for transferring serial data words to an Adder depending on the bit pattern of said serial data words.

9. The combination as recited in claim 8 wherein:
said serial data words provide a plurality of common parameters simultaneously to each microcomputer of said array elements for determining said phase shift.

10. The combination as recited in claim 9 wherein:
each of said serial data words enters said microcomputer with a least significant bit first and a most significant bit last to facilitate operation of a shift-and-add algorithm.

11. The combination as recited in claim 6 wherein:
said arithmetic operation means comprises a shifter and an adder.

12. The combination as recited in claim 6 wherein:
said register means comprises at least three registers.

13. In combination:
a phased array antenna comprising a plurality of array elements, each of said array elements comprising a microcomputer, a phase shifter coupled to said microcomputer and an antenna element coupled to said phase shifter;
said microcomputer comprising arithmetic logic means for performing addition and multiplication arithmetic operations for calculating a phase shift for an electromagnetic beam;
multiplexer gating means for transferring data constants of each array element and partial phase shift summations to said arithmetic logic means;
read-only memory means connected to said multiplexer gating means for storing said array element data constants, one of said constants providing phase shift compensation based on the position of said array element in said array antenna;
serial data input means connected to said multiplexer gating means for receiving data for specifying an amount of phase shift, said data being the same for each of said array elements; and register means for storing intermediate and final phase shift calculations connected to said arithmetic logic means.

14. The combination as recited in claim 13 wherein: at least three of said data constants are stored in said read-only memory means for providing phase shift position compensation for each antenna element and a self-test capability for each of said array elements.

15. The combination as recited in claim 13 wherein: said input serial data means receives at least three phase shift data words for specifying said phase shift.

16. The combination as recited in claim 15 wherein: input serial data received by said serial data means comprises a sum control bit means between said second and third phase shift data words.

17. The combination as recited in claim 15 wherein: each of said phase shift data words enters said microcomputer with a least significant bit first and a most significant bit last to facilitate operation of a shift-and-add algorithm.

18. The combination as recited in claim 13 wherein: said arithmetic logic means comprises a shifter, an adder and control means.

19. The combination as recited in claim 13 wherein: said register means comprises a first register means, for accumulating partial products during a multiplication operation, connected to said arithmetic logic means.

20. The combination as recited in claim 19 wherein: said register means further comprises a second register means, for storing a summation of phase shift parameters, connected to said multiplexer gating means.

21. The combination as recited in claim 20 wherein: said register means further comprises a third register means, for storing a final computed phase shift prior to transfer to a phase shifter element, connected to said arithmetic logic means.

22. The combination as recited in claim 21 wherein: a timing means generates a signal for storing said final computed phase shift in said third register means.

23. The method of calculating a phase shift for an electromagnetic beam of a phased array antenna comprising the steps of:

distributing a microcomputer in each of a plurality of array elements in said antenna, said microcomputer being coupled to a phase shifter;

performing addition and multiplication arithmetic operations for determining said phase shift by using arithmetic logic means in said microcomputer;

transferring data constants and partial phase shift summations for each of said array elements to said arithmetic logic means by a multiplexer gating means in said microcomputer;

storing said data constants for each of said array elements in a read-only memory means in said microcomputer;

compensating each phase shift calculation using at least one of said stored data constants to account for positional differences of each array element in said antenna;

calculating said phase shift from input serial data received by said microcomputer, said data being common to each of said array elements, and from at least one of said data constants stored in each microcomputer; and storing intermediate and final phase shift calculations by register means in said microcomputer.

24. The method as recited in claim 23 wherein: the step of storing said data constants comprises at least three data words in said read-only memory for providing element location correction data and a self-test capability for each array element.

25. The method as recited in claim 23 wherein: the step of calculating the amount of phase shift from said input serial data comprises at least three phase shift data words received simultaneously by each of said array elements.

26. The method as recited in claim 25 wherein: said input serial data comprises a sum control bit means between said second and third phase shift data words.

27. The method as recited in claim 25 wherein: each of said phase shift data words enters said microcomputer with a least significant bit first and a most significant bit last to facilitate said addition and multiplication operations.

28. The method as recited in claim 23 wherein: the step of storing intermediate and final phase shift calculations further comprises accumulating partial products in a first register means during a multiplication operation.

29. The method as recited in claim 28 wherein: said register means further comprises a second register means for storing a summation of phase shift parameters.

30. The method as recited in claim 29 wherein: said register means further comprises a third register means for storing a final computed phase shift word prior to transfer to a phase shifter element.

31. An array antenna for providing a directed beam of electromagnetic energy, the direction of said beam being in accordance with a beam steering signal, said array antenna comprising:

a plurality of array elements, each one of said array elements comprising a computer, a phase shifter coupled to said computer and an antenna element;

a source of electromagnetic energy;

means for feeding said electromagnetic energy to the plurality of antenna elements through the plurality of phase shifters;

means for coupling said beam steering signal to each computer in each of said plurality of array elements; and said computer in each of said plurality of array elements comprises means responsive to said beam steering signal for determining and producing a phase shifter control signal for said phase shifter coupled to said computer, said phase shifter control signal being in accordance with the position of said antenna element in said array elements and said beam steering signal.

* * * * *